United States Patent [19]

Wallace

[11] 4,211,084

[45] Jul. 8, 1980

[54] CONVERSION OF ENERGY BY MEANS OF TETHERED WHIRLWINDS

[76] Inventor: Volney Wallace, Terra, Box 1 West, Dugway, Utah 84022

[21] Appl. No.: 936,793

[22] Filed: Aug. 25, 1978

[51] Int. Cl.² .............................................. F03G 7/04
[52] U.S. Cl. ...................................... 60/641; 290/55; 415/2; 60/398
[58] Field of Search ................ 60/325, 327, 398, 407, 60/641; 126/270; 290/43, 44, 54, 55; 405/75; 415/2, 3

[56] References Cited

U.S. PATENT DOCUMENTS

| 695,524 | 3/1902 | Woodell | 290/55 |
| 4,036,916 | 7/1977 | Agsten | 415/2 X |
| 4,118,636 | 10/1978 | Christian | 290/54 X |

FOREIGN PATENT DOCUMENTS

| 415426 | 7/1910 | France | 60/641 |
| 2307982 | 12/1976 | France | 60/641 |

Primary Examiner—Edgar W. Geoghegan
Attorney, Agent, or Firm—Criddle & Western

[57] ABSTRACT

Various low grade forms of energy, particularly superadiabatic ground level air, are used to power a whirlwind. The whirlwind is tethered in a fixed place by confinement of the formative whirl from which the whirlwind arises, permitting the energy contained therein to be harnessed into useful forms of energy.

18 Claims, No Drawings

CONVERSION OF ENERGY BY MEANS OF TETHERED WHIRLWINDS

BACKGROUND OF THE INVENTION

This invention relates to a method for the production of tethered whirlwinds and to a process for the conversion of energy created by the tethered whirlwind into useful energy.

The rapid depletion of energy derived from fossil fuels is of worldwide concern. The fact that oil imports in major populated and manufacturing countries are increasing greatly and that it is believed by many experts that all reserves will be depleted in the forseeable future is ominous indeed. Other sources of energy including other fossil fuels such as coal, oil shale and tar sand, as well as geothermal, solar and atomic energy are more costly. There are socioeconomic conditions, such as the standard of living expected by developed countries, the increasing cost of energy required to meet the standard, public resistance to conservation of energy, and the high cost of alternative sources of energy that are part of the problem.

There are misgivings about the use of fossil fuels for energy. These fuels are irreplacable material resources for much of the world's chemical industry, including the manufacture of plastics and medicines. To utilize these sources for the heat they give off seems a major misappropriation of resources. The rise in atmospheric $CO_2$ resulting from using of our coal resources threatens major change in climate. The planned useage of uranium resources is also of questionable wisdom. It threatens public health and safety and even poses indisious threats to weather, and ultimately will run out, enslaving many succeeding generations with the costly and unremunerative task of fending radioactive wastes.

The basic energy resources can be divided into four categories according to the origin of the energy.
1. Atomic
2. Geothermal
3. Solar and Lunar gravitational effects (tides)
4. Solar (direct and indirect)

Atomic energy is limited in amount. Breeder reactors are under development but are meeting strong resistance from environmentalists and others who consider them to be hazardous. Geothermal energy is limitless but that which is available is in short supply. Hydroelectric energy is also limited. Tides have yet to be successfully harnessed. The building of more dams for hydroelectric power is becoming more difficult for environmental and recreational reasons. Solar energy, in some manifestations, is limited. As mentioned, fossil fuels, a form of solar energy, is much in the forefront at the energy problem. There are other forms of solar energy which are, for practical purposes, limitless and daily renewable. It is these sources of energy that are the ultimate solution of energy supply problems because of their renewable characteristics. Present technology renders such use quite unpromising because of the requirement of covering every square centimeter of the energy collecting area with high cost, high technology solar cells, mirrors or other solar energy collectors.

OBJECTS AND SUMMARY OF THE INVENTION

It is an object of the present invention to transform previously unused forms of solar energy into useful energy by novel means.

It is also an object of the present invention to utilize the energy found in superadiabic air at or near ground level by conversion of such energy into wind energy in the form of a tethered whirlwind.

Another object of the present invention is to convert heat found in humid air at or near ground level into wind energy in the form of a tethered whirlwind.

A still further object of the present invention is to utilize the electrostatic charge of the atmosphere to add power to a tethered whirlwind.

An additional object of the present invention is to utilize heat generated as a result of industrial processes into wind energy in the form of a tethered whirlwind.

The ultimate object of this invention is to initiate a tethered whirlwind, to power the whirlwind with various forms of solar energy and to transform the energy found in the tethered whirlwind into useful forms of energy.

These and other objects may be accomplished by taking superadiabatic air and one or more other forms of solar energy, if desired, from the environment as input air, directing the input air into a spiral motion in a swirl area creating a tethered whirlwind column of spiraling vertically rising air having a core of reduced pressure, utilizing the suction created by the tethered whirlwind column to impart angular and axial momentum to the input air, optionally boosting the heat content of the input air by natural or artifact means before or after entry of said input air into the whirlwind column, and harvesting the energy from the tethered whirlwind column in the form of useful energy.

DETAILED DESCRIPTION OF THE INVENTION

The whirlwind feeds primarily on heat energy. The combination of the swirl of the whirlwind and its fill of air warmer than surrounding air create a suction which powers the rotary input of air, accelerating it to the high speed of rotation that characterizes a whirlwind.

The whirlwind is a column of low density air contained in a conduit of rotating air. The air is low density because of the high temperature of input air and the centrifugal pull on the core of the whirlwind by the rotating air. Thus, the whirlwind is a column of air which weighs less per unit area of the earth's surface than the surrounding air. There is therefore subatmospheric pressure in the mouth of the whirlwind. The core of the whirlwind at ground level is reported as being from 0.5 to 2 inches of mercury below the pressure of the atmosphere outside the whirlwind. There are reports of whirlwinds drawing water up five feet indicating negative pressures of up to 4.5 inches of mercury.

When sunshine falls on the land it is absorbed with the conversion of its energy to heat. The heated surface transfers its heat to the air in contact with the surface. This heated air then rises in streamers with the streamers heating the overlying few meters of air. The rise of streamers of hot air is responsible for the optical phenomonon called heat waves and the presence of heat waves is indicative of a surface layer of hot air. The temperature distribution of this layer of air is indicated by data collected from the Great Salt Lake Desert at about 40° north latitude as follows:

| Height Ft. | Temp. °F. |
|---|---|
| Surface | 160 |
| 1 | 142 |
| 5 | 116 |
| 500 | 100 |
| 2000 | 92 |

This hot air is gravitationally unstable and will rise high into the atmosphere. In meteorology this air is described as being superadiabatic. This means that it is superadiabatic with respect to overlying air, that if raised to the elevation of the overlying air it would be warmer even after the adiabatic cooling it would sustain on being raised to that elevation and would thus seek a level above the indicated elevated layer of air.

In nature superadiabatic air is normally dissipated by rise of this air as thermals or columns to the equilibrium elevation of the air which is generally at a temperature inversion layer hundreds or thousands of feet up in the atmosphere.

Superadiabatic air can undergo convective rise via whirlwinds. The visible portion of a whirlwind is a rotating column of air extending hundreds or thousands of feet into the air, made visible by dust and debris carried aloft by the upward flow of air in the whirlwind. There is an unseen portion, the formative whirl of air, consisting of air and above ground level spiralling into the mouth of the whirlwind. Of necessity, to conserve angular momentum, this air increases in velocity as it goes to shorter turning radius and it is thus that the high speed whirl of the whirlwind is generated. It is likely that the input air is set in rotating motion initially by contact with the whirlwind, that the whirlwind is largely regenerative in its rotary motion.

The speedup of air going to smaller turning radius has another manifestation in the whirlwind. It prevents the upward pull of the whirlwind pulling the whirlwind column in two. The pull-apart force is there and in the case of the ordinary rising column of hot air it causes separation of the column from the ground layer of air with formation of a thermal. In the case of the whirlwind though, pulling apart of the column would result in speedup of the whirl as it narrowed with development of centrifugal forces which would oppose the narrowing.

Natural whirlwinds are usually powered by the solar heated near-ground layer of superadiabatic air. Whirlwinds often occur as a feature of meteorological fronts and probably result in this situation from an overthrust of cold air over warm.

The natural whirlwind is self limiting, exhausting and diluting its supply of superadiabatic air. This is indicated by temperature measurements of whirlwinds which show that the average height of their intake is well above the intense superadiabatic air layer along the surface of the ground. This is to be expected as the taking of hot air from one spot at ground level creates an instability which would react by flow of hot air away from the point and flow of cold overlying air down from above into the point. Thus the natural whirlwind is not nearly as strong as it could be. As it is, however, it is quite vigorous with horizontal winds of from about 50 to over 90 miles per hour.

There are other sources of solar energy as well as manmade sources that can be used to supplement superadiabatic air. Heat generated by sunshine is in part absorbed by evaporation of water and results in the humidification of air. This happens over water, over moist soil and where the land is covered with well watered plants. The solar energy is not lost but is simply converted to another form and can be recovered as heat by the condensation of the water from the air. A naturally occurring whirlwind contains a flow of electricity in the whirlwind column heating it and thus adding to the power thereof. The flow of electricity through the whirlwind can be favored by introduction of efficient electrodes in the base of the whirlwind to boost the electrical heating of the wind column. The upward flow of negative ions in the whirlwind column also exerts a drag on the air contributing to its upward pull. Artificial sources such as byproduct heat produced from heat exchangers in industrial operations of all kinds can also be used to boost the heat content of the input air. The input air can also be directly heated by burning fuel. This input air and air in the whirlwind column can also be heated by sunshine consequent to an added light-absorbing aerosol such as smoke.

The whirlwind can harvest the energy of any of the indicated resources and others which have not been mentioned. However, whether or not this can be successfully accomplished hinges upon being able to start up a whirlwind at will and to tether it so that wind energy equipment can be placed therein.

In nature the whirlwind can start up on a flat, windless desert. It appears that a rise of slowly rotating superadiabatic air is sufficient and that the whirl and rise are regenerative. The requirements for the startup of a manmade whirlwind are the sending aloft of a plume of hot air equal to or better in heat content, rotation and upward movement that occurs in nature. Up to a point the whirlwind grows according to how forcibly air is forced upward in spiralling motion and how hot it is. Beyond a certain point, however, growth of the whirlwind must continue by its own effects with the rise of the air in the whirlwind column providing more than enough power to draw in the input air and give it its rotary motion. The growth could come to a halt when exhaustion of the supply of superadiabatic air resulted in appreciable dilution of the input superadiabatic air with cooler air. This invention utilizes a high energy stable condition wherein the superadiabatic air and supplementary sources of energy are renewed continually avoiding the usual early demise of whirlwinds. The hot air which the whirlwind requires and is the immediate energy input to the whirlwind can be provided to a manmade whirlwind in basically three separate ways or by a combination of these ways. The first is that of taking hot air from the environment, i.e. superadiabatic air, or from manmade sources. The second is to heat air between its entrance into a feeding duct and the whirlwind column. The third is to cause the spiraling whirlwind column to be heated.

As previously indicated there is quite hot air available in the environment lying low to the ground. It is possible to take this layer of air selectively and in sufficient amounts to power a much larger whirlwind than occurs in nature. For example, consider a whirlwind power plant on or at the top of a sun-facing slope. Solar heating of the earth causes a daytime upslope flow of superadiabatic air on this hill or gully side. To harvest this superadiabatic air a ditch or a series of ditches are placed across the face of the slope and are covered with perforated plastic sheet anchored by burial into the edges of the ditchbank. Suction created by the whirlwind draws off the bottom layer of the upslope flow of superadiabatic air as it flows over the covered ditches or air ducts thereby harvesting hotter and more air than normally goes into a whirlwind. Since the whirlwind column remains fixed or tethered it is essential that the superadiabatic air be brought to it. Unlike most solar energy collectors, the ditches can harvest superadiabatic air from areas beyond that occupied by the ditch since air from adjacent areas will also flow into the ditch as the air is drawn through the ditch to the whirlwind. Moreover, the hot air in these areas is constantly being regenerated by sunlight.

Additionally, the input air in the ditches can be heated simply by use of transparent covers for the ditches and painting the interior surface of the ditch black. The ditches function both as solar energy collectors and as heaters as the hot input air travels through the ditches to the whirlwind. Other means of heating input air have already been mentioned.

Heating of air in the whirlwind column can be effected in two relatively simple ways. First, smoke or other particulate colorants can be introduced into the whirlwind air. This results in solar heating of the darkened whirlwind column. The second method is to place an efficient electrode in the base of the whirlwind to boost the earth-sky flow of electricity through the whirlwind column. Since the air has extreme high electrical resistance, a small electric current causes considerable heating of the whirlwind column.

Various other means can be used for heating input air for startup of a whirlwind. The duct system already described can be operated at different speeds depending upon the draw upon the input air. The slower the speed the hotter the input air will be. Also an intermittent operation of the airflow will result in quite hot air, on the order of 200° F. The hot output air can be heated even more by burning fuel in this air. It is also possible to wet the air ducts of this system so that the gaseous stream to the whirlwind is principally steam, lower in density than air of equal temperature and far more laden with available energy.

Depending upon design, the startup of a tethered whirlwind from a manmade facility can be passive or it can be forced by use of powered air moving equipment to inject the available hot air into the atmosphere with high velocity and considerable rotation. In general, it is desirable to design such facilities with a capability to support very strong startups. The better the startup capability is, the earlier in the day, the windier the day, the further north and the cloudier the weather the whirlwind can operate in.

Obviously the whirlwind must be tethered before it can be put to use. By tethered is meant to fix as to position the bottom end of the whirlwind column. The requirement for tethering a whirlwind can be met by restraining the formative whirl from which the whirlwind emerges from going anywhere. There are three basic ways, and combinations thereof, by which this can be achieved.

In the first method air is introduced tangentially into a generally circular enclosed space called a swirl area where it spirals into the center thereof and rises upwardly as a whirlwind and emerges through an aperture in the ceiling of the enclosed space. The enclosed space can be a shell of a building or it can be an outdoor structure with shrubbery, trees, board fences, walls and the like containing and directing the air flow. Under appropriate conditions this type of structure lends itself to the self starting of a whirlwind.

The second and third modes for starting tethered whirlwinds are not self starting but consist primarily of a stack of indeterminent height and associated power means for forcing initiation of the whirlwind in the stack. In these methods the stack would be designated as a swirl area. In the second mode, air is introduced tangentially into the stack via jets impelled by the suction of wind in the stack producing a formative whirl of the whirlwind. In the third mode, the air enters the bottom of the stack as a substantially straight flow of air and is forced into a spiral flow by air flow deflectors in the stack. In either case the initial flow of air is caused by power operated means which forces air into the stack either by a pushing or sucking motion. If desired, some or all of the air deflection into spiral motion can be effected by the blades of a wind wheel placed in the mouth of the stack. Once the whirlwind has been started by external means it can be maintained by the flow of input air into the stack.

Because of the fixed position of the swirl areas the whirlwind remains fixed as to location or tethered. In the laboratory and also in nature whirlwinds sometimes occur as sets of vertical vortices. This is apparently the result of high swirl ratio and can be avoided by keeping the swirl ratio low. In a tethered whirlwind power plant this would mean a steeper spiralling up of the air. It may prove more advantageous to promote a plurality of whirlwinds than to avoid them. It may be more economical to employ a pair or cluster of smaller whirlwinds than to have a single large whirlwind. It may also be, depending upon conditions, that there is less regenerative whirl in sets of whirlwinds and hence less tendency for the artificial whirlwind to break its tether and depart the power plant site.

The ultimate stage in this process of energy conversion is the utilization of the tethered whirlwind to produce useful energy. The most obvious use is the placement of a windwheel in the spiralling whirlwind column to convert the flow of air to mechanical energy. This power will generally be used for the generation of electricity which can easily be transported for use at distant locations. However, the mechanical energy can also be used to compress air for refrigeration, for extraction of moisture from the air and for providing dehumidified air. The input flow of air can be used for ventilation purposes. The whirlwind column itself can be used to dispose of pollutants or noxious air high into the atmosphere, for the injection of ozone and other desirable materials into the upper atmosphere, for lifting or supporting of airborne object such as sail planes or advertising and for the modification of weather. For example, in weather modification the whirlwind can cool the desert by efficient scavenging of hot air and can provide tethered clouds for local shade and rain. For more exotic uses the whirlwind can be used for digging wells by the boring action of the whirlwind base. It can also be made to emerge from the front end of a ship at sea, developing a pull on the ship that tows it through the water.

This invention is not limited to any one procedure or apparatus for the formation of tethered whirlwinds. As already mentioned, alternate procedures and types of apparatus may be employed. However, there is set forth here the best mode presently known in forming and tethering a whirlwind.

A small swirl area is constructed consisting of a round, transparent flat-topped structure of about 6 meters diameter and two meters high. In the center of the structure is a 4 meter tall stack or chimney having a diameter of one meter. Leading into the swirl area is an air collecting duct consisting of a ditch two meters wide and 50 meters long covered with layers of transparent, perforated plastic sheet. The duct enters the swirl area tagentially through a vertical slit that is sufficiently narrow, i.e. about 10 cm., to impart a windspeed of about 30 mph to air passing through the slit. The intake air duct takes in superadiabatic air evenly along its length through the perforations in the plastic sheet and the air taken in is heated to an even higher temperature by the sunshine entering the duct. The solar energy collector feature of the duct and the swirl area adds about 70 to 22 kilowatts worth of solar heat to the air in their respective areas. After startup, the suction of the whirlwind draws air into the swirl area at a speed of about 30 mph and this is accelerated sixfold by the conservation of angular momentum in the swirl. In the center of the swirl area is a mechanical system consisting of a vertical power shaft axial to the chimney having on its top portion a windwheel built rather like a paddle wheel but modified in the direction of a propeller screw so that the blades are perpendicular to the flow of air in the chimney. The lower part of the power shaft is connected to an electricity generator and may also be made to operate an air motor and a series of pumps. The mechanical assembly is attached to a pneumatic device that lifts the propeller up into the chimney or drops it out of the chimney according to the control air pressure.

Prior to startup the mechanical system is at rest, the propeller being below the chimney. Application of compressed air from a startup source such as a tank causes the propeller to rise into the chimney and to rotate thus starting the whirlwind. Also a whirlwind could be started spontaneously, such as later in the day, by generation of high temperature air within the system by solar heating and the convective force of hot air in the stack. On spontaneous startup, the propeller is sufficiently contacted by the rising airflow that it is lifted into position in the chimney.

As the propeller rises and rotates, solar heated air from the duct enters the swirl area tegentially and feeds the forming whirlwind. The lower part of the whirlwind column is tethered or fixed in place by the location of the stack or chimney. With the whirlwind thus started and tethered various sources of heat may be used to feed and perpetuate the whirlwind. Superadiabatic air will, of course, be the principal source. However, heat from condensation of moisture in the whirlwind column, heat derived as a by-product from refining, smelting, nuclear plants and other processing and manufacturing plants may be utilized. An electrode may be placed at the base of the whirlwind to increase the electric current in the core of the whirlwind thereby intensifying the power of the wind.

I claim:

1. A process for transforming heat contained in superadiabatic air at or near ground level into useful wind energy in the form of a tethered artificial whirlwind which comprises (a) initiating a tethered whirlwind column,
(b) powering said whirlwind column by causing said superadiabatic air to flow into the base of the whirlwind column, and
(c) utilizing the wind energy contained in said whirlwind column.

2. A process according to claim 1 wherein the whirlwind column is initiated and powered by introducing superadiabatic air into a swirl area having an open top causing said air to spiral and rise upwardly through the open top in said swirl area.

3. A process according to claim 2 wherein superadiabatic air is introduced tangentially into a more or less enclosed swirl area causing said air to spiral into the central portion thereof and rise upwardly through the open top.

4. A process according to claim 2 wherein the swirl area is a cylindrical vertical stack open at the top end and superadiabatic air is sucked tangentially into the stack via jets in the side thereof.

5. A process according to claim 2 wherein the swirl area is a cylindrical vertical stack open at both ends having air flow deflectors situated therein and wherein superadiabatic air is let into the bottom of the stack as a substantially straight flow of air and is caused to move in a spiral flow by said air flow deflectors.

6. A process according to claim 5 wherein the air flow deflectors are in the form of a wind wheel mounted in the stack.

7. A process according to claim 2 wherein the superadiabatic air is collected into air ducts along the length thereof and flows from said air ducts into the base of the whirlwind column in response to suction created by the whirlwind.

8. A process according to claim 7 wherein energy is added to input air after its entry into the air ducts.

9. A process according to claim 8 wherein solar energy is used to add heat to the said air.

10. A process according to claim 8 wherein water vapor is added to the said air.

11. A process according to claim 8 wherein energy is added to the said air by means of electrodes placed in the base of the whirlwind column.

12. A process according to claim 7 wherein the wind energy is used to drive wind wheels located in the whirlwind column thereby converting wind energy into mechanical energy.

13. A process according to claim 12 wherein the rotation of the wind wheels drives a generator converting mechanical energy into electrical energy.

14. A process according to claim 1 wherein the wind energy is used to elevate noxious air and pollutants into the upper atmosphere.

15. A process according to claim 1 wherein the whirlwind column is used to support airborne objects.

16. A process according to claim 1 wherein the whirlwind column is used to modify weather by removal of solar heated ground level air.

17. A process according to claim 1 wherein a plurality of whirlwind columns are employed.

18. A process according to claim 2 wherein powered equipment is employed to cause a sufficient rise of air of sufficient angular momentum and heat content to initiate the said tethered whirlwind.

* * * * *